United States Patent [19]
Blonder et al.

[11] Patent Number: 5,113,041
[45] Date of Patent: May 12, 1992

[54] INFORMATION PROCESSING

[75] Inventors: Greg E. Blonder, Summit; Robert A. Boie, Westfield, both of N.J.

[73] Assignee: AT&T Bell Laboratories, Murray Hill, N.J.

[21] Appl. No.: 635,086

[22] Filed: Dec. 28, 1990

[51] Int. Cl.⁵ .............................................. G08C 21/00
[52] U.S. Cl. ........................................ 178/18; 178/19
[58] Field of Search ..................................... 178/18, 19

[56]  References Cited
U.S. PATENT DOCUMENTS
4,255,617  3/1981  Carau et al. .................. 178/19

*Primary Examiner*—Stafford D. Schreyer
*Attorney, Agent, or Firm*—G. S. Indig

[57]  ABSTRACT

Information processing, for example by means of a computer, is served by a tablet in combination with an inputting implement such as stylus or human finger. Such a tablet-implement combination may serve in lieu of or ancillary to other inputting means such as a keyboard. Implement positional information, e.g., as contacting the tablet, depends upon interpolation as between segmenting lines in the tablet. Cost advantage commensurate with resolution/noise desiderata is ascribable to use of analog information (without digitization) in interpolation.

32 Claims, 8 Drawing Sheets

FIG. 3
FIG. 3b
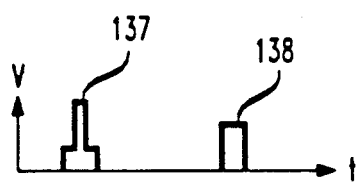
FIG. 3c
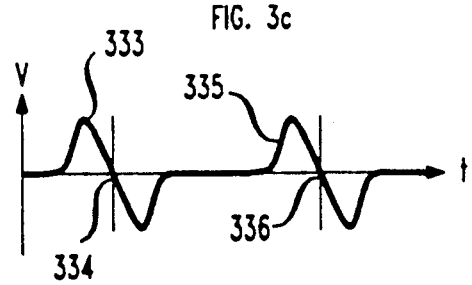
FIG. 3d
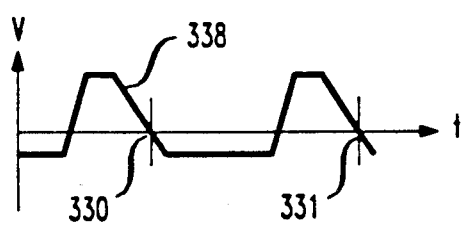
FIG. 3e
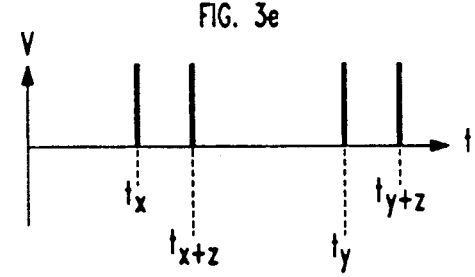
FIG. 3a
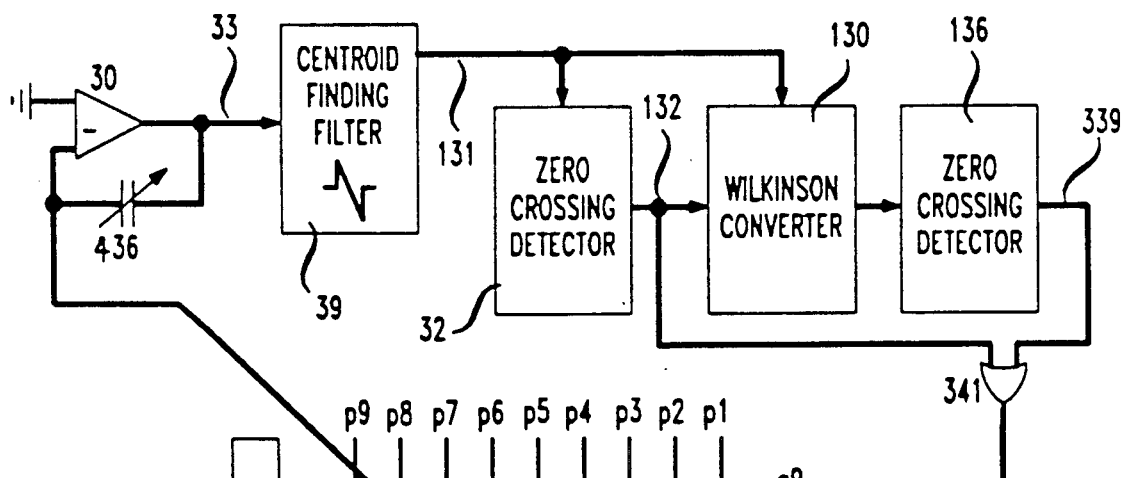
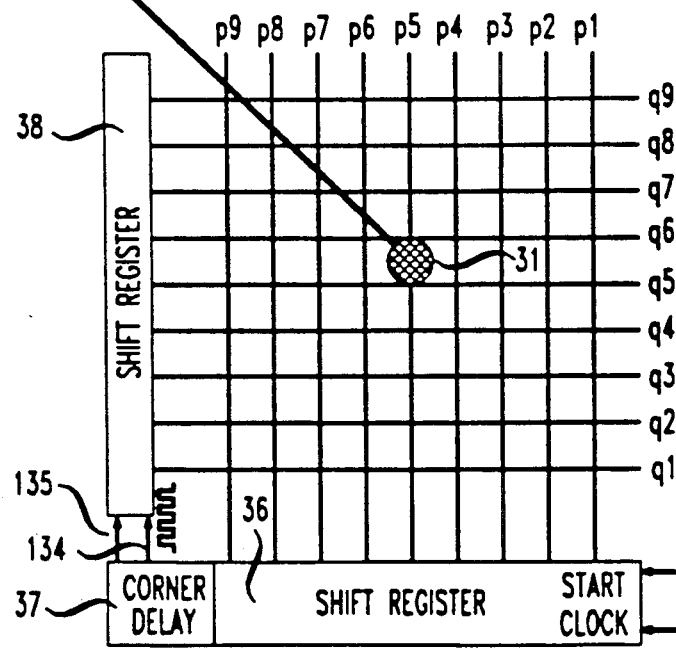

FIG. 4
FIG. 4a
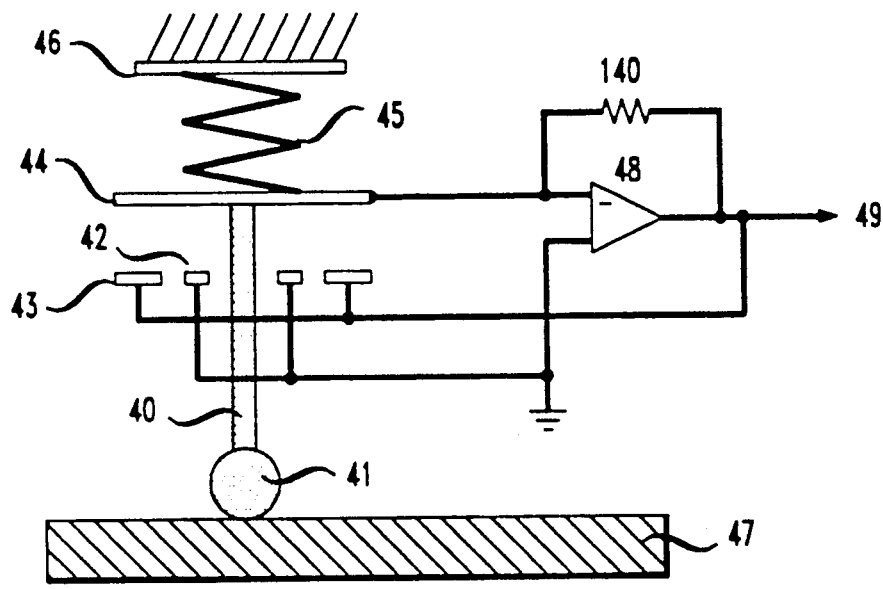
FIG. 4b
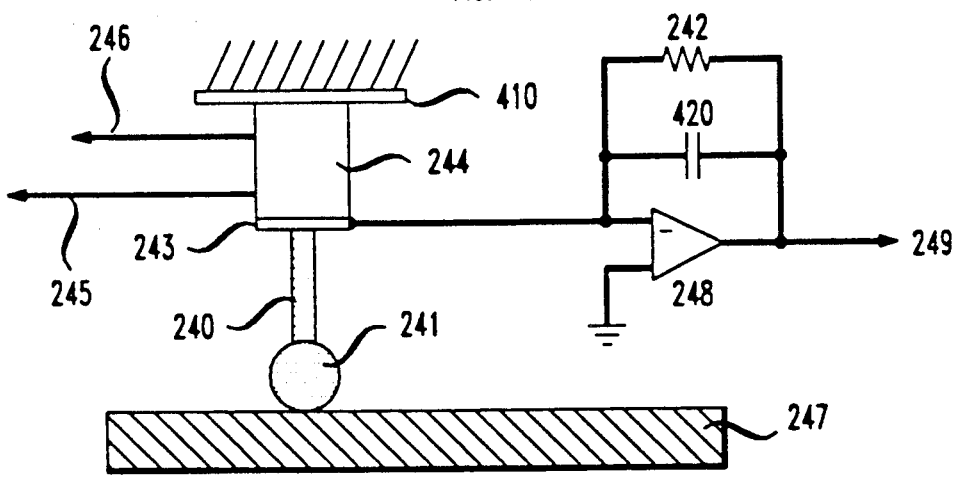
FIG. 8
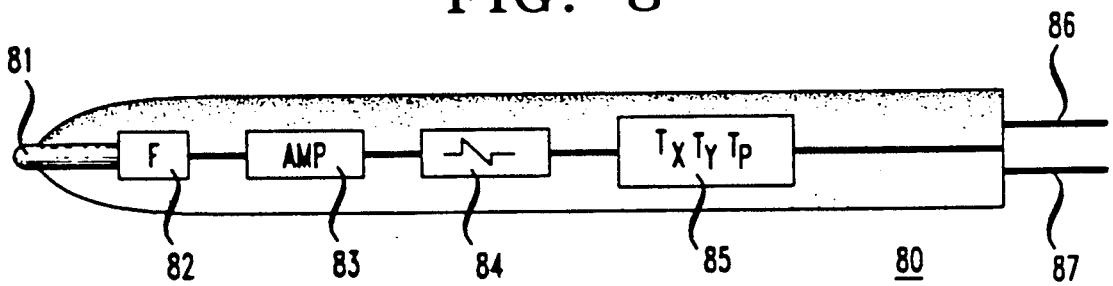

FIG. 11
FIG. 11a
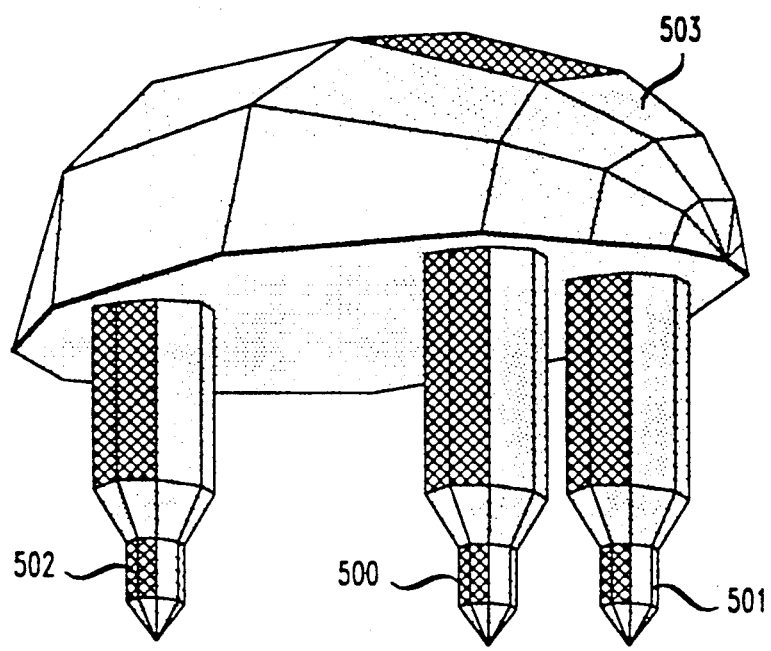
FIG. 11b
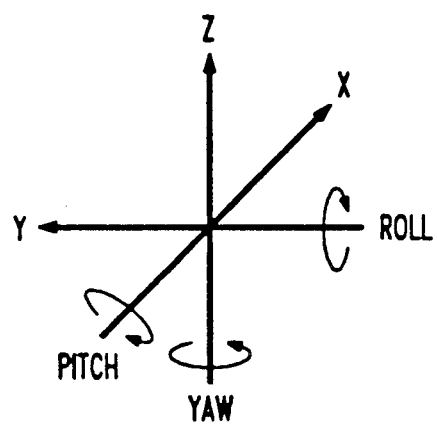

INFORMATION PROCESSING

BACKGROUND OF THE INVENTION

1. Field of the Invention

The invention relates to information processing and, in particular, concerns the inputting, and perhaps the controlling, of information to be processed. In general, it contemplates use of a tablet in combination with a writing or positioning implement—e.g. a stylus ("pen") or finger in which the combination may replace or supplement the usual keyboard.

2. General Background

Information processing, now advanced to a sophisticated level, is of increasing value in most aspects of life. It initially took the form of large fixed equipment—of general purpose computers—and this continues to be of major importance. Emerging equipment takes a variety of other forms as well. Advances in semiconductor circuitry—particularly in miniaturization of large-scale integrated circuitry—has permitted expedient use in portable apparatus. Such advances are of economic consequence, and have led to special as well as general purpose use.

Traditional apparatus has utilized keyboard input, and this will no doubt continue to be important. A number of factors, however, including user training, impediment to portability, fixed small number of keys, etc., all point to substitution or supplementation by other inputting means.

Considerable attention has been paid to inputting by means of a "graphics tablet", a form of which is the "touch screen". The tablet may be soft or hard, may involve interaction with a stylus, or may depend upon finger pressure. Monitoring by the user as well as other purposes may be served by display or hard copy. Display may take the form of a Liquid Crystal Display or Cathode Ray Tube—in either event underlying a transparent tablet or as a separated piece of apparatus.

A clear trend is away from large fixed equipment. The portable "scratch pad" or "notebook" computer relies on tablet input. This type of apparatus may serve as a self-contained computer or may be a means for addressing a main frame computer. Variations may be provided with printed forms with spaces to be filled in by a stylus which, in this instance, serves also as a traditional writing implement.

The invention is of value, too, where keyboards are inherently inadequate. A prime example here is for "graphical input" e.g. of diagrams or drawings. Kanji, the Japanese word language, is illustrative of another such example—that in which the number of symbols to be input vastly exceeds usual keyboard capability.

Whether used in fixed or portable equipment, flexibility inherent in the tablet expedites a number of functions. These include: "menu selection" to control graphically oriented operating systems, e.g. in "Microsoft Windows" ® and in a proposed form of the "smart phone" which combines the functions of a phone, phonebook, and data terminal onto one device controlled with a touch screen; signature verification or other means for authorization for user access; in "smart forms", where input information usually in the form of block printing, is recognized and compared with memory to assure entry validity. (See, for example, "Orange County Register, H1, Nov. 15, 1990.)

Problems of consequence in relevant equipment are set forth:

Low Cost

It is desirable to keep the number of components and their complexity to a minimum. The entire device must be manufacturable with high yield.

Low Power Consumption

In portable machines, power dissipation is often a key limitation. Designs which require extensive calculation, and the like, all draw significant amounts of power.

High Resolution

The tablet technology should not conflict with a person's natural expectations based on familiarity with plain paper and pencil input. Thus, the tablet technology should be capable of discerning features of a size consistent with a single dot of a pencil. This resolution for many purposes is about $\frac{1}{4}$ mm.

High Accuracy

In many envisioned applications, an associated, underlying displayed image will follow the motion of the pen. If the technology is not of high absolute accuracy, the correspondence between the actual pen position and the displayed image will vary. At best, this is distracting, at worst, it will cause the apparatus to execute an unintended function.

High Optical Transparency

Although contemplated information inputting is not limited to transparent tablets, some use, e.g., with an underlying LCD (liquid crystal display), high transparency is crucial. Low transparency tablets greatly reduce the contrast of the displayed image.

Fast Response Time

A moving hand can easily translate the pen at a speed of a few cm per second. Thus, with a $\frac{1}{4}$ mm resolution as the goal, a data rate of a few hundred points per second is necessary to follow the movement of the hand. In many prior art tablet designs, these high data rates adversely impact cost, power dissipation and/or accuracy.

All these criteria have not been met in any one tablet available today.

3. Terminology

Discussion of the prior art as well as the invention is expedited by definition of terminology as used herein.

Information Processing

This terminology is intended to encompass inputting with interpolation, perhaps followed by such processing as to minimize effect of variants, e.g., in individual-to-individual handwriting, always with a goal of input standardization, e.g., to substitute for keyboard inputting. Output may perhaps involve conversion from one form to another (e.g. from handwriting to speech or type)—as well as subsequent activity, perhaps involving computation.

Graphics

Description is sometimes in terms of "graphical" input/"graphics" tablet, etc. This terminology ("graphics" and variants) is used in the manner familiar to those skilled in the field, as encompassing information of varied form—in contrast with restrictions imposed by the usual keyboard. Accordingly, "graphics" is intended to encompass the variety of inputs of general interest, including inter alia: lettering, upper case as well as lower case; cursive writing, and drafting, both freehand and mechanical. Purposes include: recognition; verification—e.g. signature verification; annotation, e.g. supplementing text files with editorial comments; and graphical control e.g. directing function in the manner of a mouse, controlling loudness for an audible device, controlling the flow or function of computation, etc.

Inputting Implement

Initial interest is expected to focus on a pen-like stylus—usually leaving no imprint on the writing surface, but sometimes providing written hard copy as well. Other uses suggested above may be satisfied by the user's finger. Description, generally in terms of a "stylus" or "pen" is meant to encompass the entire family of implements which may benefit by the inventive advance.

Writing Tablet

This term encompasses all that is implicit in the foregoing. It is a generic requirement of the invention that the tablet be segmented—usually by orthogonal electrically conductive lines of segmentation, although unidirectional segmentation may be sufficient for some purposes and is contemplated. Variations of the tablet include fully transparent versions permitting overlay on an interactive display (the combination constituting what is sometimes referred to as a "touch screen")—as well as "opaque" versions (perhaps including transparent regions together with opaque regions). Fully opaque versions may serve in simple "menu selection", e.g. on a printed form, likely providing for hard copy of input, perhaps on a disposable or replaceable sheet. A separate display may be useful, particularly with opaque versions.

Position Sensing

Here reference is made simply to location of the implement, perhaps as stationary, perhaps as moving, generally on a two-dimensional plane as segmented in x and/or y orthogonal directions. In accordance with the invention, position sensing necessarily entails some degree of interpolation within segments. Position sensing is that of the inputting implement in contact with or in near-contact with the tablet (i.e. of the implement while in writing position).

Functional Apparatus

It is expected that initial commercial use will entail conventional computers—certainly involving notebook and other portable versions, as well as mainframe and other stationary forms. Other apparatus, function of which is altered or controlled by the invention, may encompass a wide variety; e.g. printing apparatus, facsimile apparatus, musical instruments, etc., etc. A particular use envisioned is in conjunction with variations on the "smart phone"—a telephone provided with graphical input/output/display means.

DESCRIPTION OF THE PRIOR ART

The keyboard has been associated with the computer from the very beginning. Its limitations are well recognized. Implicit inconvenience due to its bulk, the extensive skill and training required for its use, and its inflexibility have all pointed to a stylus, either supplemental to, or substituted for the keyboard. Many contemplated uses of the computer require a degree of portability precluded by the keyboard. The notebook computer is an example. Made possible from the electronic standpoint by advances in large scale integrated circuits, this is a generally self-powered, notebook sized input device including a tablet—of a few inches in size—provided with a writing implement and likely a display. Of the size, weight and portability of a common notebook, it may communicate with a mainframe or serve as a self-contained computer. In any event, functionality may be as extensive as that previously requiring large-sized stationary apparatus.

Envisioned devices provide for real time, high accuracy entry of information being input—usually provide for display as well. Satisfaction of these requirements has been costly.

An early approach makes use of a non-segmented tablet surface bounded on four sides by conductive stripes, each maintained at a fixed potential. The inputting implement introduces a current (AC or DC) onto the tablet, where it is measured on the four stripes. The pen position is determined by the relative division of current among the stripes. Variations on the approach include the reverse-sensing by the stylus of signals introduced on the stripes. Accurate interpolation is limited by non-uniformity in the resistivity of the tablet surface, inherent noise of the resistive surface and numerical "rounding" errors when calculating the pen position. (See U.S. Pat. No. 4,672,154 issued Jun. 9, 1987.)

The most advanced prior art device takes the form of a tablet again segmented by spaced x and y conductors. Position sensing of the stylus is based on sequential pulsing of first x and then y conductors at a cycle time as related to writing speed which is sufficient for needed resolution. Analog-to-digital conversion of the induced (or transmitted) signal from the pen is stored and used to calculate the position. Positioning, in part based on interpolation, may be of sufficient accuracy and rapidity. Meeting such criteria, however, gives rise to significant circuit and operational complexity which, in turn, impact cost and possibly portability as well. Restricting the degree of digitization addresses both problems but impacts resolution. Commercial offerings, meeting operational needs, are priced in the hundreds and thousands of dollars. (See Hewlett-Packard Journal, June 1987, "Permuted Trace Ordering Allows Low-Cost, High-Resolution Graphics Input", pages 4–12.)

SUMMARY OF THE INVENTION

The invention is properly considered as based on a variety of criteria each of which has far ranging implications. Taken together, they provide method and apparatus for low cost, low power consumption, high resolution, graphical inputting and control. A major aspect of the invention addresses impediments of cost and complexity by a methodology and apparatus involving extensive interpolation of pen position within segmented regions of the tablet. This aspect depends most importantly upon direct use of analog position information. This represents a departure from initial and extensive digitization which has become second nature to state-of-the-art workers. This departure is, itself, alone responsible for substantial reduction in needed circuitry/equipment, and, accordingly, in reduced cost and increased portability. Initial analog information is conveniently processed by use of a centroid-finding filter. Position information may be supplemented e.g. by stylus-to-tablet spacing and/or, if in contact, by force; and also by velocity of writing. It may be supplemented as well by orientation information—accomplished by use, e.g., of an inputting implement with multiple address. Such an implement may in essence behave as two or three individual styli of fixed relative position.

While a primary aspect of the invention is as described above, specific apparatus/method considerations are of broader consequence. A preferred stylus design makes use of force-dependent capacitance variation to permit continuous monitoring of this parameter—of particular interest in signature verification. The stylus-tablet combination lends itself to an underlying display. A tablet design minimizes visual interference caused by segmenting members to result in a tablet which is transparent to the unaided human eye. Most effective position interpolation is a function of the spacing between the stylus and segmenting members. Relevant teaching takes the form of the relationship between such spacing and segment size.

Considerations of the preceding paragraph are of importance for a variety of uses: in computer apparatus/process where information is initially digitized; in less sophisticated applications requiring less resolution; for direct communication use where "information processing" is restricted to that required for effective utilization of communication channels.

BRIEF DESCRIPTION OF THE DRAWING

FIG. 1a is a perspective view of a structure showing an inputting device interacting with a tablet.

FIG. 1b is a detail of the structure of FIG. 1 but of design specifically providing for transparency to accommodate an underlying display.

FIG. 1c is an enlarged planar view of a segmenting member of FIG. 1b.

FIG. 1d is a plot, on coordinates of capacitance on the ordinate and y position on the abscissa, depicting capacitance as a function of y stylus position on the tablet.

FIG. 1e is a plot, on coordinates of capacitance on the ordinate and x position on the abscissa, depicting capacitance as a function of x stylus position on the tablet.

FIG. 3 includes FIG. 3a, a schematic diagram depicting a stylus and tablet, appropriately equipped for cyclically pulsing x and y lines, including a centroid filter and a Wilkinson converter, as discussed, designed for translating positional, as well as, force information into units of time. FIG. 3 also includes plots, denoted FIGS. 3b, 3c, 3d, 3e, on coordinates of voltage, V, and time, t, show the relationship between these parameters for signal information as discussed in the Detailed Description.

FIG. 4 diagrammatically depicts alternative versions of a force-sensitive stylus. The stylus of FIG. 4a is based on a force-sensitive feedback capacitor, while the stylus of FIG. 4b depends upon magnetostriction.

FIG. 8 is a diagrammatic view of a self-contained force sensitive stylus.

FIG. 11 consists of FIG. 11a, a schematic perspective view depicting a mouse employing three styli to measure pitch, roll, and yaw, as well as position and force together with FIG. 11b, a three-coordinate diagram relating the positions and force for the three styli to pitch, roll, and yaw.

DETAILED DESCRIPTION

Figure 1:
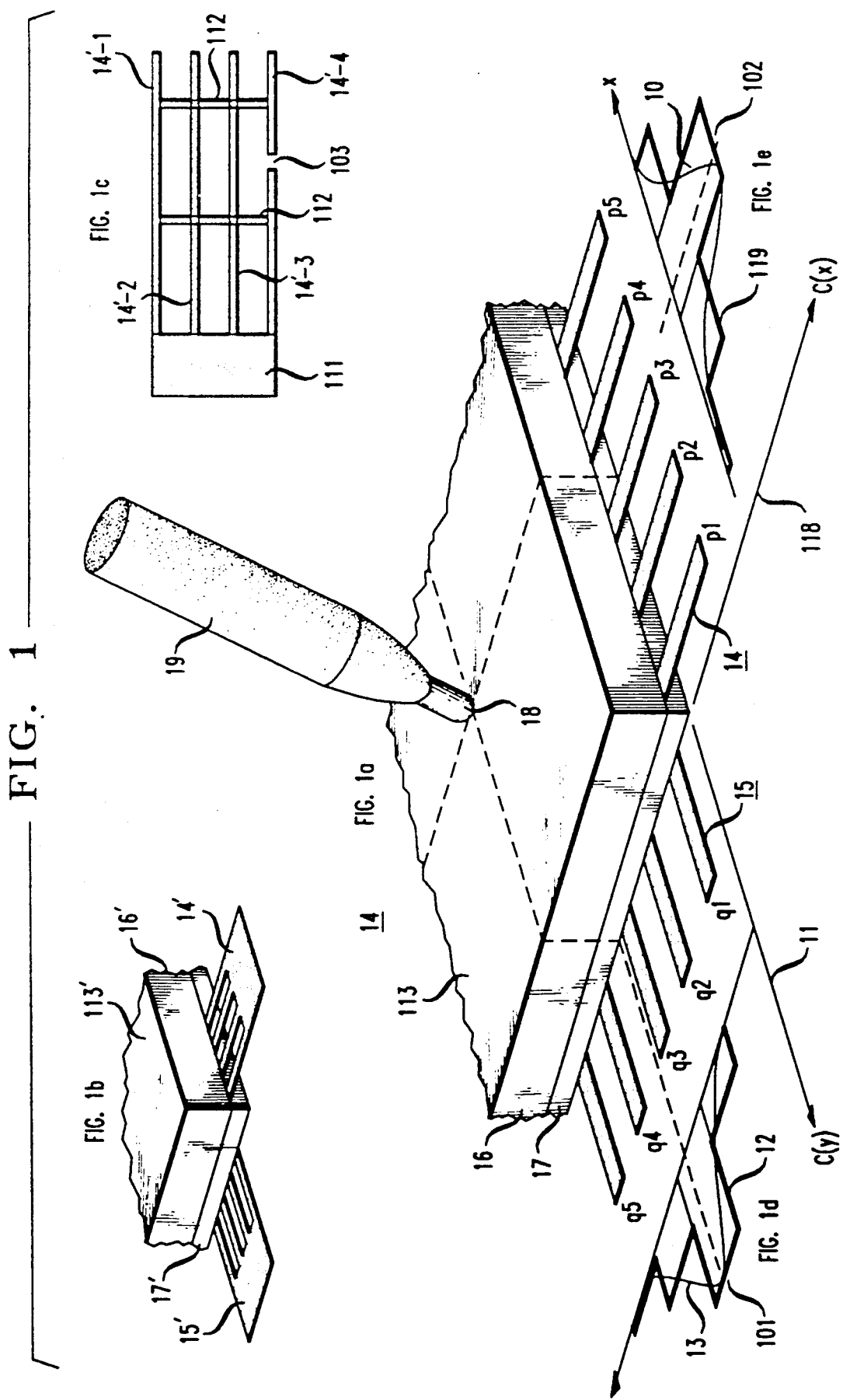
FIG. 1 consists of five figures, 1a, 1b, 1c, 1d and 1e as follows.

The apparatus described and depicted schematically is in generalized format to expedite discussion of representative variations. Consistent with much of the discussion herein, it is initially described in the form of two embodiments considered likely to be two of the earliest forms to be used commercially. The first embodiment described is a transparent graphics tablet intended to overlay a display.

The apparatus shown in FIG. 1a includes an inputting device, in this instance a stylus including a body portion 19 and tip 18. The associated tablet is provided with a set of equal dimension and equal spaced x conductive strip structures 14 (p1, p2,—, pi) and a similar set of y conductive strip structures 15 (q1, q2,—, qj) separated by a thin layer of insulating material 17. It is generally favorable for this layer to be as thin as practicable. A second layer of insulating material 16 separates the pen and strips while writing and also serves as a supporting substrate. The apparatus includes means, to be described in detail later on, for measuring the electrical capacitance between stylus tip 18 and the individual strip structures 14 and 15. This embodiment relies on the unique relationship between the x, y and z positions of the stylus tip 18 with respect to the strips 14 and 15 and the distribution of capacitance between tip and the conductive plane formed by the strips. The centroid of the capacitance distribution $C(x,y)$ coincides with the x-y position of the tip while the z parameter, the force with which tip 18 engages contacted surface 113, or, alternatively, the distance of tip 18 from surface 113 if spaced, is related to the total capacitance or strength of $C(x,y)$. Since $C(x,y)$ is found to be circularly symmetric about the tip position, (for the instance described which entails equally dimensioned as well as equally spaced x and y strips—of course on the assumption of a layer 17 of sufficient thinness) the projections $C(x)$ and $C(y)$ of $C(x,y)$ onto the coordinate axes x and y contain sufficient information to locate the pen. The projected distributions $C(x)$ and $C(y)$ are illustrated in graphical form in FIGS. 1e and 1d respectively. The one dimensional centroids $x_c$ 102 and $y_c$ 101 of the projections $C(x)$ and $C(y)$ respectively, coincide with the centroid of the original distribution and hence the location of the pen on the tablet surface. The dimensions and spacings of strip structures 14 and 15 are chosen to provide adequate sampling of C(x) and C(y). Histogram 119 of FIG. 1e illustrates the spatial relationship between the capacitance of the pen tip to each of the strip structures 14. Histogram 119 illustrates the sampling C(pi) of the projection while curve 10 illustrates the underlying projection C(x). Strip structure 14 is composed of thin conductors which are relatively widely spaced so that strips 15 are minimally shielded to result in sample C(y) of only marginally diminished strength compared to C(x). Graph 11 illustrates the sampling of the underlying capacitance distribution projection C(y) 13 and the sampling of capacitance C(qj) between pen and strips 15 shown in histogram form 12. The centroid of the sampled measurements C(pi) and hence the measured x position of the pen tip here expressed in units of the x strip spacing interval is $$x_c = \frac{\sum_{i=1}^{m} i \cdot C(pi)}{\sum_{i=1}^{m} C(pi)}$$

where m equals the number of strip structures 14.

Similarly the centroid of the sampled measurements C(qj) and hence the measured y position of the pen tip here expressed in units of the y strip spacing interval is:

$$y_c = \frac{\sum_{j=1}^{n} j \cdot C(qj)}{\sum_{j=1}^{n} C(qj)}$$

Figure 7:
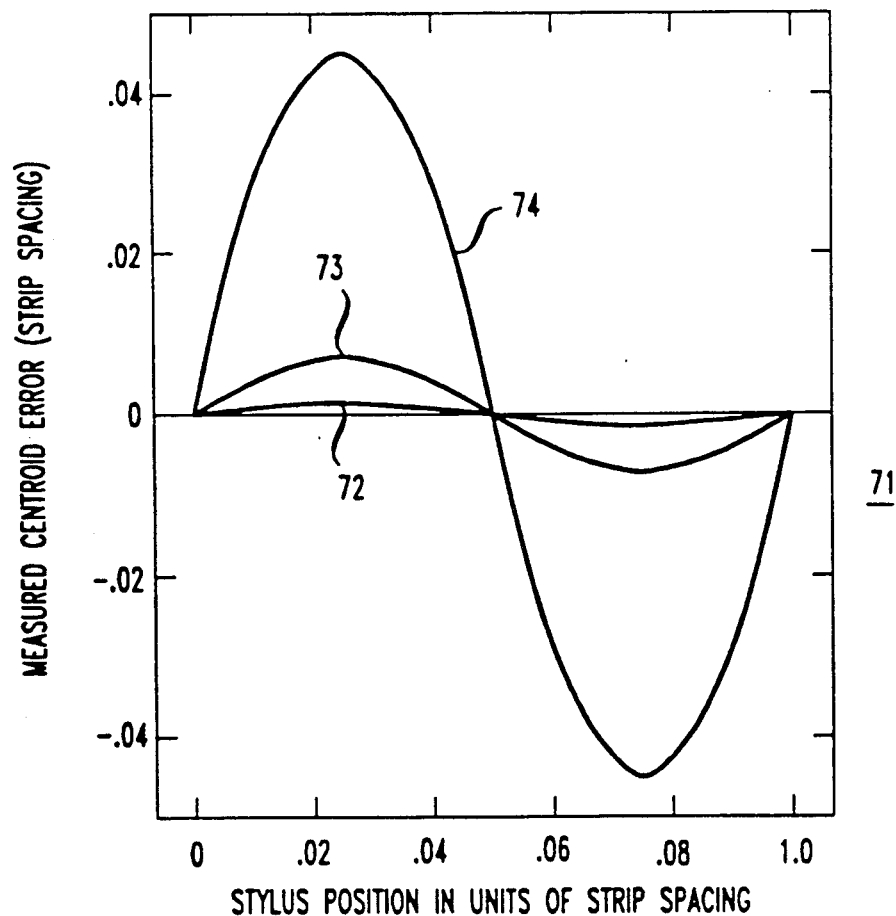
FIG. 7 is a plot depicting the relationship between the measured centroid error on the ordinate and stylus position on the abscissa as related to apparatus design criteria as discussed in the Detailed Description.

Glass sheet 16 separates pen tip 18 from strips 14 and 15 at contact. The thickness of glass sheet 16 is an important design parameter in, among other factors, assuring operational effectiveness while minimizing tablet cost. The signal-to-noise ratio of capacitance measurements between the inputting implement (discussed in terms of the usual "stylus") and the individual strips provides a fundamental physical limit to position resolution and accuracy. The noise in such systems is dominated by electronic noise that can be characterized by an equivalent additive and, for the measurement means considered here, a fixed uncertainty in the sampled capacitance measurements C(pi) and C(qj). The magnitude of C(pi) and C(qj) are nevertheless dependent on the proximity of the stylus to the strips. Thining of layer 16 has two important effects. First, the relative uncertainty in capacitance and hence position is advantageously reduced. Second, in accordance with the relationship between the layer 16 thickness and the width of the capacitance distribution C(x,y), correspondingly narrower and more strips are required to insure adequate sampling for centroid finding. Inadequate sampling leads to systematic, i.e. not noise related, errors in centroid finding. To take an extreme example, consider a layer 16 reduced to a thickness where the total extent of distributions C(x) and C(y) is much less than the strip spacing. Although the signals C(pi) and C(qj) would be strong there would, nevertheless, be stylus positions (centered over strips for example) where motion of the stylus produces no change in the centroids measurements $x_c$ and $y_c$ and hence results in large positional error. Such errors become negligible when the strip spacing and spreading layer thickness are made nearly equal. Data in graph 71 of FIG. 7 illustrates the expected systematic errors in true position due to inadequate sampling during centroid finding for three ratios of strip spacings to the layer thickness. Curve 72 shows the difference between true position and centroid as the true position is varied over one of many strips used to find the centroid. The error data is normalized to the strip spacing interval. Curve 72, 73 and 74 data result from strip spacings that were 1.0, 1.17 and 1.33 times the layer thickness respectively. Note that the errors become small if the strip spacing is equal to or less than the spreading layer thickness.

A tablet design with a particular capacitance measurement means may be optimized with regard to cost by increasing the spreading layer thickness to the point where the increasing uncertainty in capacitance due to noise begins to impact the desired position resolution. The strip spacing is then chosen so that systematic errors are appropriately small. The number of strips and measurement electronics are then minimized with respect to tablet area and desired resolution. The time required to determine position is also minimized since the number of measurements are also reduced.

In an actual embodiment strip set 14 was produced by deposition of metal on a free surface of the glass sheet 16 followed by deposition of insulating layer 17 and, in turn, of metal strip set 15. Detailed section FIG. 1c, shows a detail of a version exhibiting sufficient tablet transparency to expedite viewing of an underlying display. In the version shown, strips 14 and 15 of the primary FIG. 1a embodiment are replaced by parallel-connected metal strips of reduced width. In FIG. 1c each such segmenting structure is shown as composed of a group of four parallel narrow metal strips, e.g., 14'-1, 14'-2, 14'-3, 14'-4 connected together at metal electrical contact pad 111. Each individual strip 14' is sufficiently narrow in width dimension to be invisible to the unaided eye at normal viewing distance. Fine dimensioned cross connections 112 are placed at intervals along the strip in order to preserve continuity and hence functionality in the event of fabrication defects illustratively shown as break 103 in strip 14'-4. For a particular structure used in an example herein, the individual conductors making up array 14' (as well as 15', not shown) were of 5 μm width while the distance between array members 14'-1, 14'-2 . . . is 254 μm. Cross connections 112 are spaced at 1 cm intervals. Strip structures 14 and 15 (as well as 14' and 15') are of sufficient lengths to span the tablet surface and are placed at 1.27 mm center-to-center intervals. The glass spreading layer is 1.27 mm thick while the separator layer 17 is 25 μm thick.

Figure 2:
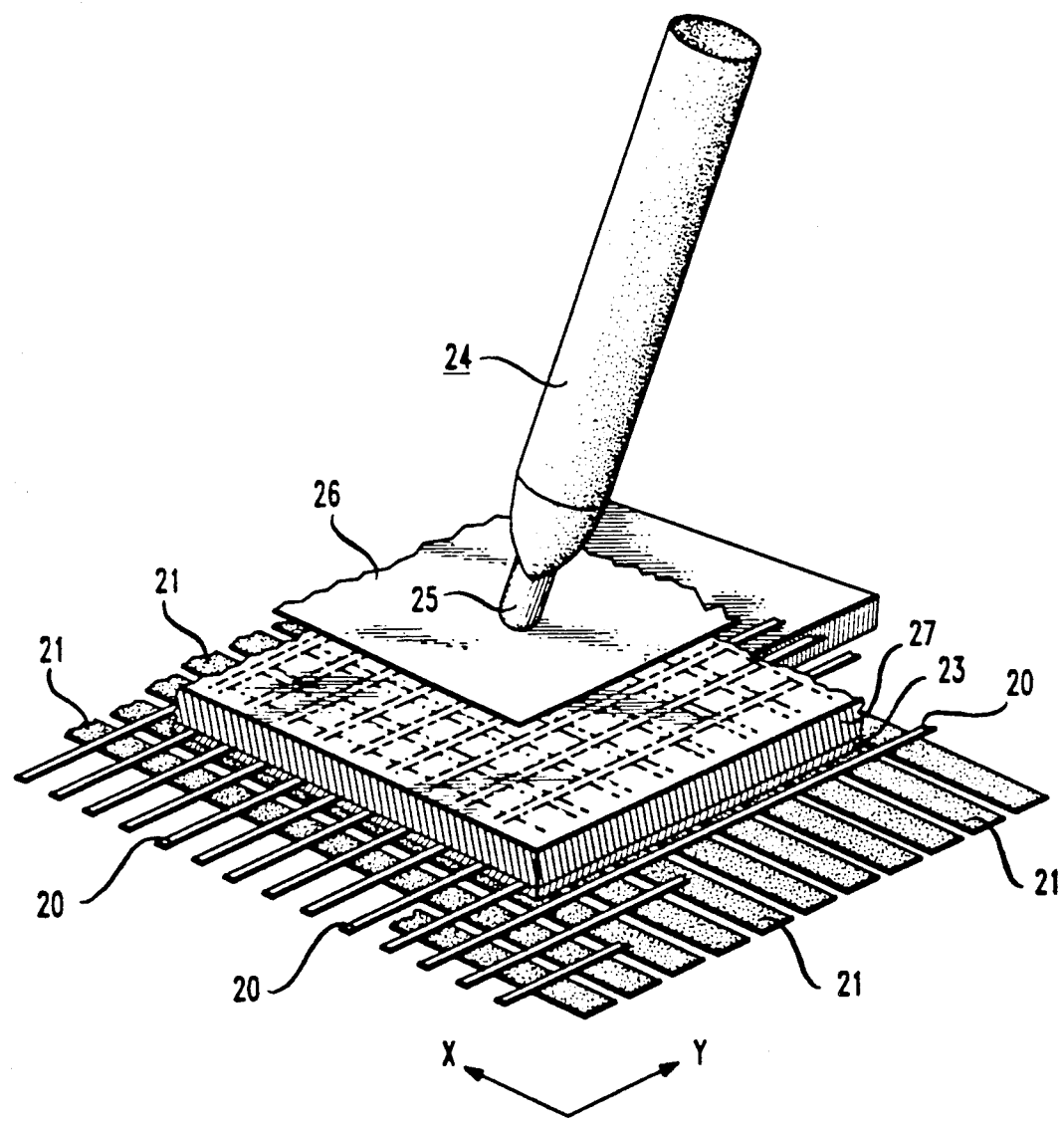
FIG. 2 is a perspective view of a stylus and tablet. This version of the invention is of a configuration appropriate for use in an opaque writing tablet and may be fabricated with conventional printed circuit board technology.

The apparatus depicted in FIG. 2 is similar to that of FIG. 1 but is intended for applications not requiring transparency, and hence makes use of lower cost printed circuit board fabrication technology. This embodiment, an example of such application, differs in the follow respects. The x conductive strips 20 are narrow single strip structures. The y strips 21 are somewhat wider in order to compensate for the shielding of the overlying x strips. The writing stylus tip 25 is shown contacting a sheet of paper 26 overlying a layer of the printed wiring board substrate 27. Layer 27 serves also as a spreading layer for the capacitive distribution. Tip 25 differs from tip 18 in that it is additionally provided with a means not shown (e.g. ink or lead) to mark on paper in order to provide hard copy. Other design considerations concerning basic operation—the capacitive measurement means, the centroid-finding method, spreading layer thickness, strip spacings, etc.—are similar to those described in connection with FIG. 1.

For a particular structure used in an example herein, individual conductors 20 are of 0.2 mm width spaced on 1.27 mm interval while conductors 21 are of 1 mm width spaced on 1.27 mm interval. Spreading layer 27 is 1.27 mm thick while separation layer 23 is 0.1 mm thick. A ballpoint cartridge with 0.7 mm ball tip was used.

FIG. 1 and FIG. 2 are in deliberately simplified form and are intended as representative of a variety of fabrication as well as design alternatives. For example, an operating embodiment was based on a separate x and y of conductive strip structures deposited on individual glass sheets (rather than on opposite sides of a single sheet). Two such sheets were oriented with conductors facing and at 90 degrees and assembled with a thin deposited separator layer.

FIG. 3 illustrates a preferred method for measuring C(pi) and C(qj) and for determining stylus x-y position by use of an analog linear centroid-finding filter, as well as stylus proximity and force, by use of a force sensitive feedback capacitor in the stylus circuit, in combination with an amplitude-to-time converter. Strip to stylus tip capacitance is determined by measuring the displacement current that flows to the stylus tip in response to pulsing of a strip. As shown in FIG. 3a, amplifier 30 is configured as an operational integrator by virtue of feedback capacitor $C_f$. Capacitor 436 is shown as variable, denoting its ability to follow force variation between stylus and tablet force. A voltage pulse on a nearby strip couples through stylus tip 31 to the amplifier input producing a corresponding voltage pulse at output node 33 that has similar but inverted form. A pulse of amplitude Vs applied to, for example strip p5, produces an output at 33 of the same form with amplitude $-V_s(C(p5)/C_f)$, where C(p5) is the capacitance of interest. For this arrangement, output signal amplitude increases as the stylus tip is brought nearer the surface, thereby decreasing capacitor plate spacing as between the stylus plate and the relevant x or y segment divider. Shift registers 36 and 38 facilitate uniform amplitude pulsing of strips in fixed time sequence relative to start signals 35 and 135, and fixed frequency clocking signals 34 and 134. Corner delay shift register 37 ensures adequate separation in time between x and y signals for all stylus positions on the surface. Output signal at 33 is time-correlated with the position of strips, and is amplitude-correlated with their capacitance and applied force. The resultant voltage signal vs. time at node 33 for the stylus position illustrated is shown on the plot of FIG. 3b. The signal marked 137 is due to sequential pulses applied to strips p4-p5-p6 while signal 138 is due to sequential pulses on strips q5-q6. The signals from other far away strips do not contribute significantly to the output signal for the stylus-to-tablet spacing, e.g., for the FIG. 1 spreading layer 16 thickness, contemplated in this plot.

Since the strips are pulsed sequentially at a uniform rate and with uniform amplitude, the time centroids of these two separated signals relative to the start signal 35 are a linear measure of the centroids of C(x) and C(y) and hence of the x and y stylus positions. The time difference between start and the time of the first centroid multiplied by a fixed scale conversion factor of (strip spacing dimension)/(clock period) measures the x position of the stylus with respect to the first strip p1. Similarly y is measured by the time difference between the start signal 135 to its shift register 38 (a fixed time following the start of the x shift register) and the time of the second centroid.

The two time centroids are found directly by use of a linear filter 39 in combination with zero-crossing detector 32. The time of output voltage zero-crossing of a centroid-finding filter is the time centroid of the input signal plus a fixed delay time. This invariant property of centroid-finding filters holds for input signals whose extent of non-zero signal energy is less than the time width of the centroid filter impulse response. An appropriate design for the centroid-finding filter 39 is described by V. Radeka and R. A. Boie in "Centroid Finding Methods for Position-Sensitive Detectors", Nuclear Instruments and Methods, vol. 178 (2-3), pp. 543-544 (December 1980). The output response to signals 137 and 138 as seen at node 131 of filter 39 consists of signals 333 and 335 as illustrated graphically in FIG. 3c. Zero-crossing detector 32 responds by producing a timely logic level signal in response to zero-crossings 334 and 336. The times between start signal 35 and the appearance of these signals at node 132 measure the x and y positions of the stylus. The two voltage pulses shown as $t_x$ and $t_y$ in the graph of FIG. 3e are the output of zero crossing detector 32. The maximum or peak voltage outputs of the linear filter 39 are a measure of the strengths of signals input and hence measure proximity plus force.

The time measurement processing format is preserved by using an amplitude-to-time converter 130 to measure the maximum values of signals 333 and 335. The converter is based on the Wilkinson converter (see Proceedings of the Cambridge Philosophical Society, vol 46, Part 3, pp 508-518, (July 1950)). The converter determines input amplitude in the following manner. The output 338, illustrated in FIG. 3d, follows the input to its maximum value. The peak value is held constant until signaled by detector 32 when a linear run-down process begins. The output declines at a constant rate. The time required from beginning of run-down to crossing zero volts 330 and 331 are linear measures of the peak amplitudes. The time differences between output signals 132 and output signals 339 are linear measures of the amplitude of signals 333 and 335 and hence of proximity (and or of force, as detailed below). The two signals in the graph of FIG. 3d corresponding to these zero crossings are shown as pulses $t_{(x+z)}$ and $t_{(y+z)}$. Signals at 132 and 339 are spaced in time and are usefully combined in "OR" circuit 341 to produce a single output signaling 340.

A stylus design providing for force measurement responsive to capacitance change is illustrated in FIG. 4a. In the arrangement shown, stylus tip 41 is mechanically and electrically coupled by rod 40 to moving capacitor plate 44 supported by spring 45 which is, in turn, coupled in an electrically insulating manner to the stylus body 46. Bearings, not shown, help support the tip structure while allowing motion only along the axis of conductive rod 40. Plate 44 is electrically connected to the inverting input terminal of amplifier 48 while fixed plate 43 is connected to the output 49. Plates 43 and 44 form the feedback capacitor for the amplifier. Forces between the stylus body 46 and the surface of tablet 47 cause plates 43 and 44 to separate and hence increase the output signal by virtue of the increased gain of the circuit. Guard ring plate 42 enhances the effect. Resistor 140 serves to provide bias current to the amplifier input and is selected to be as large as is practical. For particular apparatus, capacitance of capacitator 43-44. varied over a range of from 10 pf to 3 pf for a contacting force within the range of from 0 to 1.5 Newtons. Other capacitor geometries and spring arrangements may be used. The present design measures the component of force along the pen axis. An arrangement entailing a ball stylus tip (serving as first capacitor electrode) elastically suspended in a mechanically fixed spherical cup (serving as the second capacitor electrode) can provide uniform tablet force measurement for a wider range of pen angles.

An alternative stylus embodiment, dependent on strain measurement is illustrated in FIG. 4b. Force between the stylus body 410 and the surface of tablet 247 is transmitted from the tip 241 through rod 240 and insulator 243 to strain gauge 244. Applied force changes readings as measured between terminals 245 and 246. Output signals 249 from amplifier 248 with fixed feedback capacitor 420 and bias resistor 242 measure the x, y, and z position of the tip while terminals 245 and 246 provide independent force information. The strain gauge may, for example, be a magneto-striction device.

In addition, force may be directly measured as an increase in proximity to the tablet if the spreading layer (e.g. layer 16 of FIG. 1) is of rubber or other flexible material. As stylus tip 18 approaches layer 16, the capacitance-dependent signal amplitude changes, e.g., increases, reaching a maximum when in contact with hard dielectric layer 16. A soft layer, however, deforms, compresses, with increasing stylus force, so that signal amplitude can increase further in proportion to contacting force.

Radeka and Boie describe a realization of the centroid-finding filter based on a delay line design. This filter is nearly perfect in response form and, therefore, facilitates very fine interpolation between strips.

Figure 5:
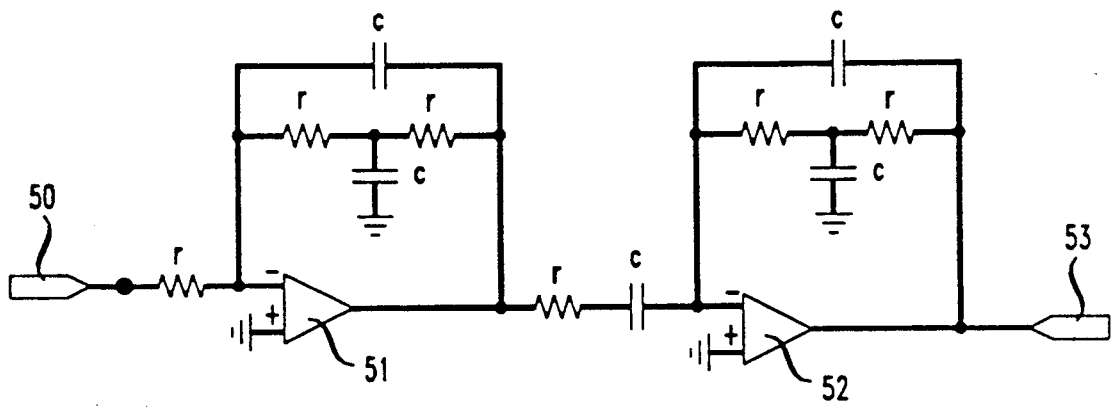
FIG. 5 is a circuit diagram of a centroid finding filter designed with a view to cost saving while retaining capability for interpolation of stylus position to a resolution finer than segment size—e.g. by a factor of sixteen in accordance with Example 1 herein.
Figure 9:
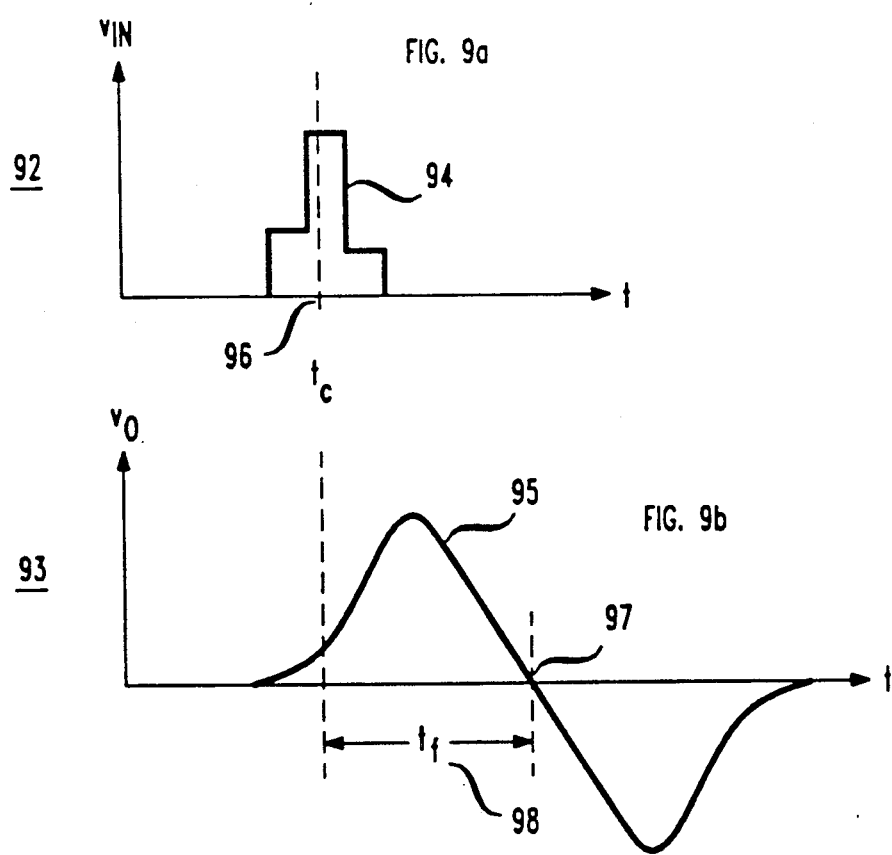
FIG. 9 shows two plots, those of FIGS. 9a and 9b, relating capacitance-signal positional information, first as detected and then as processed, for example, by use of a filter such as depicted in FIG. 5.

A simplified centroid-finding filter is described in conjunction with FIG. 5. Its use permitted interpolation of 1 in 16 to achieve the desired resolution of 0.08 mm for segment spacing of 1.28 mm. Input and output are sensed at nodes 50 and 53. All passive components are specified as multiples or sub-multiples of a resistance r and capacitance c. The product of c times r is related to the period of the tablet shift registers shifting period, i.e. the reciprocal of the clock frequency 34 of FIG. 3. Here, in one specific embodiment, the product c·x is equal to ½ of the clock period of 2.1 µsec. Amplifiers generically described as operational amplifiers 51 and 52 were National Semiconductor LF351 components. This filter serves as centroid-finding filter 39 of FIG. 3a in that input signals similar to 137 and 138 produce output signals similar to 333 and 335 respectively, as described with fixed correspondence between the input signals time centroids and the output signals zero-crossing times. The fixed relationships $t_f$ 98 between time centroid $t_c$ 96 of an input signal 94; and of the output 95 with zero-crossing time 97 are illustrated respectively in FIGS. 9a and 9b. Many alternate designs are possible. The feature of importance in any centroid filter is the degree to which the response has a linearly sloping form about its zero crossing over the time extent of the signal. A high degree of interpolation requires a highly linear slope. It is also advantageous, for processing time and noise considerations, to minimize the extent of the filter response that is outside of the linearly sloping region.

Required circuitry for centroid finding, proximity and force measurement may be integrated in a sufficiently small volume for mounting within stylus 80 as illustrated in FIG. 8. Here tip 81 and force sensitive element 82 are combined with an integrated circuit containing amplifier 83, centroid finding filter 84 and signaling element 85 to provide output signal at 86. This signal is functionally equivalent to signal 340 of FIG. 3. The stylus receives analog information from the tablet and transmits, either by a wire or wireless method. 3 digital timing signals i.e. $t_x$ followed by $t_{x+z}$ and $t_y$. Signal $t_{y+z}$ is also transmitted but is not used. Note that only the time information must be preserved in transmission. This information is introduced to, e.g., a computer, not shown, via a channel shown schematically as 86. As discussed, channel 86 may be a cable connected directly with such computer, or may represent a wireless link. Channel 86 may entail an r.f. transmitter, an optical fiber and transceiver, a light emitting diode and detector transmitting wirelessly, etc. For the pen illustrated, power is introduced via channel 87. In the instance in which the output signal is carried by wire, power is most conveniently provided by wire as well. In the case where the signal is transmitted through a wireless link, power is conveniently supplied by a battery, not shown, in which event channel 87 as well as the battery may be enclosed within stylus 80.

A tablet system consists of a tablet and pen as described above and a computer or controller that provides the following minimum tablet-related functions in addition to its other tasks. The controller provides the clock and start signal to the tablet whenever stylus information is desired. The start signal enables three digital timer circuits (or their functional equivalents) within the controller. The first three timing signals following the start signal from the stylus circuits cause the timers to be stopped or disabled in order. The first time measurement represents the x position, the difference between the second measurement and the first represents the proximity and force, while the third time measurement represents the y location of the stylus tip. It is advantageous that the timer clock be a multiple of the tablet clock, i.e. a multiple of 16 as used in the described embodiment. This method is fast, an important factor in tasks such as signature verification where useful information is contained in the writing dynamics. The total readout time of a tablet scales with its linear dimensions. An operating system reads a 20×20 cm area in less than 0.73 msec.

Figure 6:
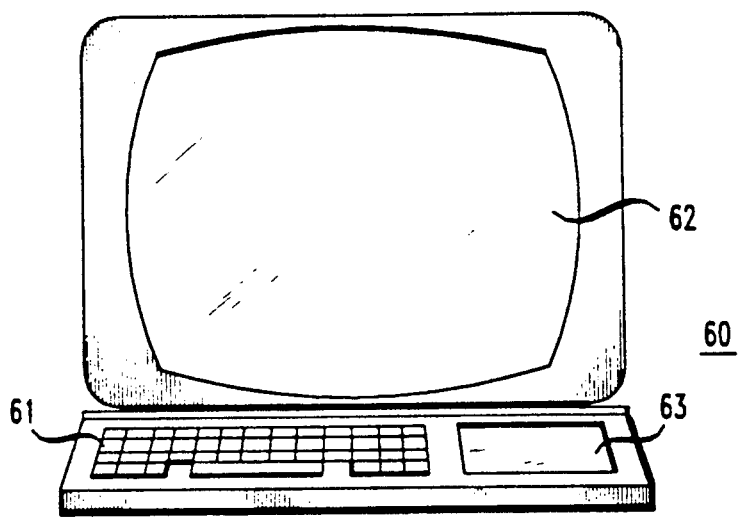
FIG. 6 is a perspective view of a notebook computer including a keyboard supplemented by a touch screen.

FIG. 6 depicts apparatus-a form of notebook computer-likely to represent an early form of manufacture in accordance with the invention. Computer 60 as shown is composed of display screen 62 together with a conventional keyboard 61, supplemented by tablet 63. Tablet 63 is either of transparent or opaque design in accordance with the inventive teaching. Input to tablet 63 is by use of a stylus, e.g., by stylus 19 as shown in FIG. 1. Apparatus, as first manufactured, is likely to depend on keyboard 61 for primary input. Tablet 63 may serve in lieu of a mouse, simply to establish position. It may be provided with a stylus not shown to enable introduction of simple auxiliary graphical information. Later designs may depend entirely on the tablet and eliminate the keyboard.

GENERAL

Inputting methodology and apparatus are first described in terms of Example 1 and Example 2, respectively, following which variations are set forth.

EXAMPLE 1

The method employs sequentially driven lines on a transparent glass plate as shown in FIG. 1. The lines, in these embodiments, are driven from a series-connected set of 8 bit shift register integrated circuits as shown by elements 36, 37 and 38 in FIG. 3. National Semiconductor 74HC164M CMOS 8 bit shift register circuits are surface mounted directly on the tablet substrates for both glass and conventional printed circuit substrates shown in FIG. 1 and FIG. 2.

EXAMPLE 2

This apparatus example relates to construction of a transparent hard tablet of particular design. The tablet is constructed of two 1.27 mm thick glass plates of approximate planar dimensions 4"×4" with a functional, writing area of approximately 3×3 inches. Each plate is provided with an array of parallel metal lines running the length of the board. Lines on 1.27 mm centers are terminated in bonding pads of approximate dimensions 1 mm·1 mm. Arrays are produced by sputter-deposition of successive layers of 500 Å thick titanium, 1,000 Å thick platinum and 4,000 Å thick gold followed by pattern delineation. Patterning is effected by masked illumination of positive photoresist followed by ion milling to remove gold and platinum, and by wet chemical etching (in EDTA) to remove titanium. After resist stripping and cleaning of the glass surface, solder paste is applied to the bonding pads, required shift register chips and decoupling capacitors are put in place, and the entire assembly is heated on a hot plate in air to melt the solder and attach the shift register circuits.

Two such plates with orthogonally disposed line arrays, are bonded together at 12 μm spacing by use of spacing glass rods of that diameter dispersed in a transparent silicone rubber (Dow Corning 184).

Fabrication variations are endless-some of likely commercial advantage are set forth:

1. Sequential sputter deposition of unpatterned layers of titanium, platinum and gold may be replaced by e.g. first deposition of Ti ($\approx 500$ Å) for electrical conductivity, masking with photoresist, and thereafter selective plating with nickel and then by gold.
2. Chromium may be deposited and photodefined by wet chemical etching. Bonding pads may then be gold plated.
3. The silicone rubber may be replaced e.g. by a sheet of adhesive plastic—thermoplastic or thermosetting.
4. Hybrid integrated circuit techniques (e.g. wirebonding an unencapsulated integrated circuit directly to the substrate) may replace surface mounting of already-packaged chips.
5. Transparent, or, for that matter opaque tablet fabrication, may depend upon a single supporting plate rather than on two juxtapositional plates. Layers of metal, and dielectric may be sputtered, sprayed, or sheet laminated, with metal layers already patterned as deposited, or to be patterned.
6. Patterned layer fabrication may be by silk screening of conductive paste, perhaps subsequently heated to drive off organic carrier used in deposition.

DISCUSSION

Many other variations within the scope of this invention are possible. For example, although the use of a force sensitive capacitive element internal to the stylus is an advantageous way to measure force, other sensors may be used. These include a variety of strain gauge designs, linear voltage transducers, and so forth that could be used to provide independent force information via separate signaling, or may be used as gain varying elements in the manner of the force sensitive capacitor described. In general, only one pen would be used at one time in most applications. Nevertheless, multiple styli in combination with a tablet may have significant utility. One such structure has served as a multiple degree of freedom computer "mouse". The stylus circuit described may have compact form other than a pen. In this structure, illustrated in FIG. 11a, three styli, 500, 501, 502, were mounted in the rigid base 503 of the mouse in a manner such that their respective tips may simultaneously contact the tablet. The contact tips were arranged to be on the vertices of a 3 cm side length equilateral triangle. As illustrated in FIG. 11b, mouse position, including orientation, with respect to the tablet x, y, and yaw angle are completely determined from the three styli position while the three force measurements determine the downward force component as well as the applied torques in the roll and pitch direction.

In another variation, the pen or stylus can be considered more generically as a detector above the tablet to receive the capacitance signal. For example, a uniform flexible conducting sheet could be spaced above the segmenting tablet. This sheet would receive signals from all lines, but the amplitude of those signals would be constant and independent of position. Thus, the centroid filter would not select any particular location. However, if a finger, rod, pencil tip, etc. pressed the flexible film towards the segmented tablet, the sheet would locally bow and draw closer to the tablet in one area above a small number of segmenting lines. When those lines are electrically active the received signal on the flexible sheet would be larger (due to the closer proximity to the tablet) than its neighbors, and the centroid filter would then accurately locate the position of the stylus to the tablet.

Figure 10:
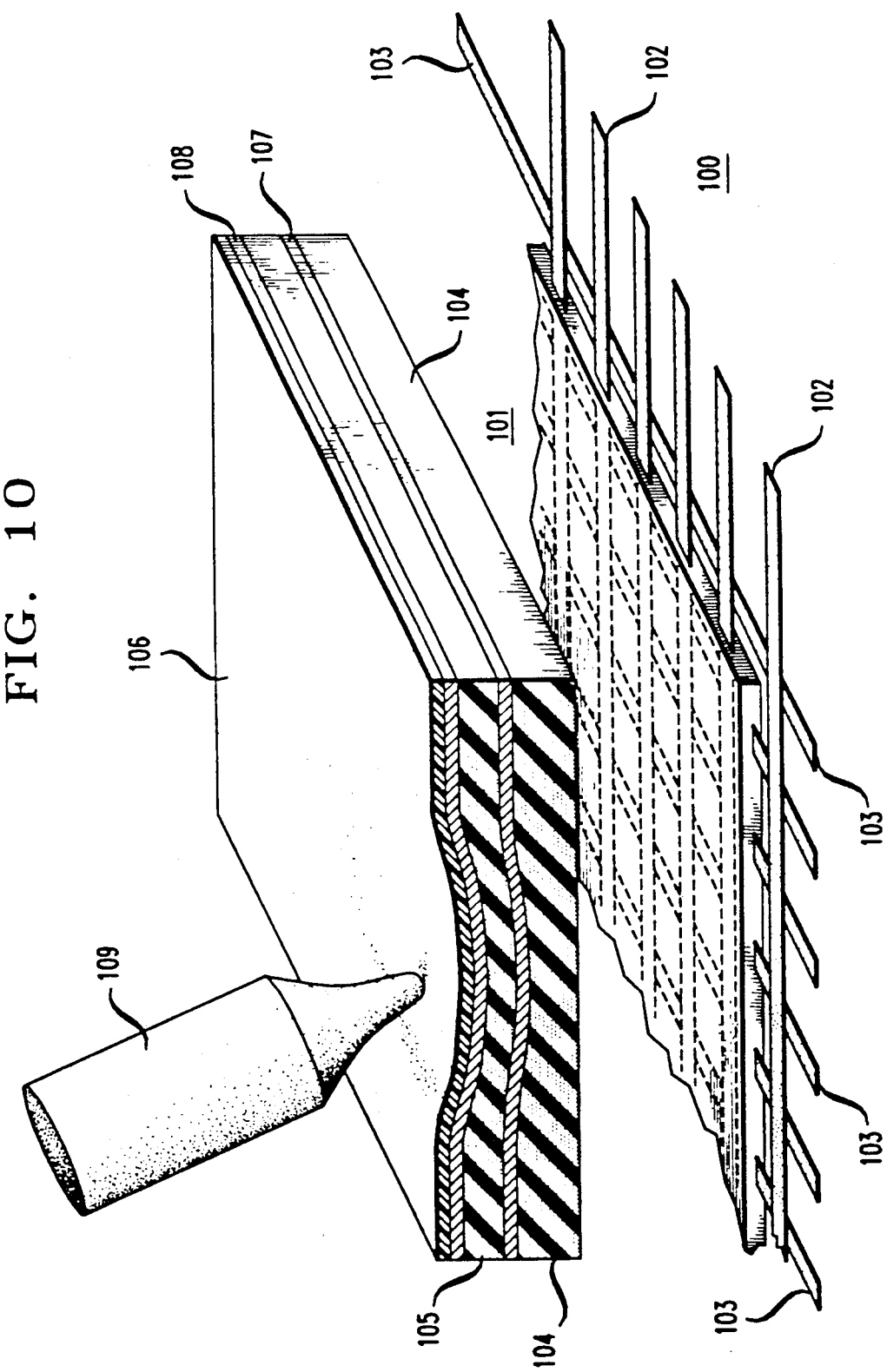
FIG. 10 is a perspective view depicting a touch screen depending upon local compression and consequent decrease in spacing between capacitance-determining electrodes.

FIG. 10 depicts a version of the invention related to the "touch screen". It may serve a function similar to that of a mouse or trackball. It may serve to attain the high-resolution objective common to versions of the invention based on rigid materials or may serve the relatively non-demanding function of the usual touch screen. A touch screen is generally sufficiently served by relatively coarse position location, e.g. of a position on a smart form. Structures 100 and 101, shown as separated, are juxtapositioned in the functioning device. Structure 100 is similar to that of FIG. 2. A specimen device, of dimension 1.5"-2", carries the dielectrically separated x and y arrays 102 and 103. For usual opaque versions of the apparatus shown, segmenting conductors of these arrays were similar to those described in conjunction with FIG. 2. Structure 101 consists of foam rubber layer 104, conducting layer 107 to sense the signal, foam rubber layer 105, conducting layer 108 which is a ground plane to shield 107 from electrical noise from outside pad, and finally top surface layer 106. The position input signal is that produced by pressure of inputting implement, e.g. contacting stylus 109 or a human finger. Layer 106 is designed to protect the structure from contamination and is otherwise such as not to affect function. It is simply a low-friction layer, perhaps one or a few mils thick, of sufficient flexibility to transmit stylus pressure corresponding with perhaps of as little as 5 grams total force. Layers 107 and 108, each of perhaps one mil thickness, are of sufficient conductivity and flexibility to permit functioning. Structures tested have manifested a layer 104 thickness change of ≈5% for 20 gram pressure.

We claim:

1. Apparatus for information processing comprising an inputting implement, together with a tablet which includes a free surface inputting region accessible to the implement, an initial signal generator including said implement or said region, an initial signal detector including the other of said implement or said region, in which positioning of the implement within the inputting region is determinative of at least part of the information to be processed, together with provision for generation of a final signal including such positioning information, said region being electrically segmented into at least five segments in at least one direction within the said region, each such segment being at least ten times coarser than the resolution of positioning information included in the final signal, together with means for interpolating position of the inputting element within a segment thereby resulting in positioning information of such resolution, further including means for electrical pulsing of the said initial signal generator for producing a corresponding time-dependent initial signal in the said initial signal detector, whereby the said final signal is yielded and is transmitted to an associated unit of the said information processing apparatus characterized in that the said initial signal comprises time-dependent, undigitized, analog initial positioning information, and in that the said initial signal detector includes a time domain, centroid-finding filter for interpolating position to yield positioning information of such resolution for inclusion in the final signal.

2. Apparatus of claim 1 in which the tablet and inputting element are capacitively coupled so that the signal produced by the said initial signal generator is received by the said initial signal detector through circuitry including capacitive coupling, and in which the said region is segmented in two directions within the said region, whereby both initial and final positioning information contains information pertaining to both directions.

3. Apparatus of claim 2 in which the said two directions are essentially orthogonal, whereby positioning information contains x and y information.

4. Apparatus of claim 3 in which said inputting element comprises a stylus having a tip which contacts the free surface of said region in the course of inputting, said stylus including an element serving as one of the two capacitor plates involved in the said capacitive coupling, and in which electrical segmentation of the said tablet is by electrically conductive segmenting lines.

5. Apparatus of claim 4 in which the initial signal generator includes the said tablet and said apparatus includes means for sequentially pulsing such segmenting lines in cyclical fashion.

6. Apparatus of claim 4 together with force-sensitive element for sensing the force with which the stylus engages the said region so that the initial signal includes such force information.

7. Apparatus of claim 6 in which the said force-sensitive element is physically associated with the stylus and comprises a capacitor.

8. Apparatus of claim 6 in which the force-sensitive element is physically associated with the stylus and comprises a strain guage.

9. Apparatus of claim 4 including an associated display device to produce a display incorporating final positioning information.

10. Apparatus of claim 9 in which the associated display underlies the said tablet at the inputting region, in which the display device provides a display incorporating essentially real time positioning information so as to appear to be responsive to the stylus, and in which at least the said inputting region is of sufficient transparency as to permit viewing the display therethrough.

11. Apparatus of claim 4 including a display device underlying the tablet for producing a visible display of a pattern introduced by the said inputting implement.

12. Apparatus of claim 11 in which the said display is a liquid crystal display device.

13. Method for information processing comprising introducing information by capacitive interaction of an inputting implement and an inputting region of an electrically segmented tablet, electrically pulsing the implement or tablet so as to yield an initial time-dependent signal containing initial position data for said implement relative to the said region, interpolating such initial position data so as to yield a final signal containing final position data which establishes position at a resolution which is better than that of electrical segmentation, characterized in that initial position data is in analog form and is input to a time domain, centroid-finding filter, thereby yielding said final position data.

14. Method of claim 13 in which the said inputting implement is a stylus having a point in contact with the said inputting region during at least a part of the time of introduction of information to be processed, and in which the said time-dependent signal varies in accordance with the force with which the point engages the inputting region.

15. Method of claim 14 in which the initial signal comprises information comprising movement of the implement during a time period of uninterrupted contact with the inputting region so that said initial signal contains position data which varies correspondently.

16. Method of claim 15 in which information to be processed includes cursive writing.

17. Method of claim 15 in which information to be processed includes signature verification.

18. Method of claim 15 in which said initial signal contains information dependent on velocity of the implement during such movement.

19. Apparatus for information processing comprising an inputting implement, together with a tablet, which includes a free surface inputting region accessible to the implement, an initial signal generator including said implement or said region, an initial signal detector including the other of said implement or said region, in which positioning of the implement within the inputting region is determinative of at least part of the information to be processed, together with provision for generation of a final signal including such positioning information, said region being electrically segmented into at least five segments in at least one direction within the said region, each such segment being at least ten times coarser than the resolution of positioning information included in the final signal, together with means for interpolating position of the inputting element within a segment thereby resulting in positioning information of such resolution, further including means for electrical pulsing of the said initial signal generator for producing a corresponding time-dependent initial signal in the said initial signal detector, whereby the said final signal is yielded and is transmitted to an associated unit of the said information processing apparatus characterized in that the said inputting implement comprises a stylus provided with a force-sensitive element for sensing the force with which the stylus engages the said region and in which such force-sensitive element depends upon a capacitor having a first plate which moves relative to a second capacitor plate responsive to such force so as to result in a force-dependent change in capacitance.

20. The apparatus of claim 19 in which the force-dependent change in capacitance is a consequence of movement of the said first plate.

21. Apparatus of claim 19 in which movement of the said first plate is a maximum of 0.5 mm for a force of 200 grams.

22. Apparatus of claim 19 in which the said capacitor is part of circuitry responsible for positioning so that a force-dependent change in capacitance changes the amplitude of such positioning information as contained within the final signal.

23. Apparatus of claim 19 further characterized in that the said initial signal comprises time-dependent, undigitized, analog initial positioning information, and in that the said initial signal detector includes a time domain, centroid-finding filter for interpolating position to yield positioning information of such resolution for inclusion in the final signal.

24. Apparatus for information processing comprising an inputting implement, together with a tablet, which includes a free surface inputting region accessible to the implement, an initial signal generator including said implement or said region, an initial signal detector including the other of said implement or said region, in which positioning of the implement within the inputting region is determinative of at least part of the information to be processed, together with provision for generation of a final signal including such positioning information, said region being electrically segmented into at least five segments in at least one direction within the said region, each such segment being at least ten times coarser than the resolution of positioning information included in the final signal, together with means for interpolating position of the inputting element within a segment thereby resulting in positioning information of such resolution, further including means for electrical pulsing of the said initial signal generator for producing a corresponding time-dependent initial signal in the said initial signal detector, whereby the said final signal is yielded and is transmitted to an associated unit of the said information processing apparatus said apparatus further including a display device underlying the tablet for producing a visible display of a pattern introduced by the said inputting implement characterized in that the said tablet and inputting element are capacitively coupled whereby positioning information is capacitance dependent, in which segmentation of the said tablet is by electrically conductive segmenting lines with each such segment being defined by ganged segmenting lines, electrically connected in parallel, in which each line contained in a gang is of insufficient thickness as to significantly interfere with transparency, sufficiency of capacitive coupling being assured by multiplicity of lines within the gang.

25. Apparatus of claim 24 in which each ganged segmenting line within the said region is of a maximum thickness of 10 μm as viewed through the said free surface.

26. Apparatus of claim 24 in which parallel electrical connection of ganged segmenting lines comprises buses within the said region.

27. Apparatus of claim 24 characterized in that the said initial signal comprises time-dependent, undigitized, analog initial positioning information, and in that the said initial signal detector includes a time domain, centroid-finding filter for interpolating position to yield positioning information of such resolution for inclusion in the final signal.

28. Apparatus for information processing comprising an inputting implement, together with a tablet, which includes a free surface inputting region accessible to the implement, an initial signal generator including said implement or said region, an initial signal detector including the other of said implement or said region, in which positioning of the implement within the inputting region is determinative of at least part of the information to be processed, together with provision for generation of a final signal including such positioning information, said region being electrically segmented into at least five segments in at least one direction within the said region, each such segment being at least ten times coarser than the resolution of positioning information included in the final signal, together with means for interpolating position of the inputting element within a segment thereby resulting in positioning information of such resolution, further including means for electrical pulsing of the said initial signal generator for producing a corresponding time-dependent initial signal in the said initial signal detector, whereby the said final signal is yielded and is transmitted to an associated unit of the said information processing apparatus characterized in that the said inputting implement is a stylus having a point in contact with the said inputting region during at least a part of the time of introduction to be processed, in which electrical segmentation is by electrically conductive segmenting lines and in which provision is made for electrically spacing such lines relative to the portion of the tablet-contacting stylus determinative of positioning information, such spacing being within the range of from 0.25× to 4× segment dimension, with a view to obtaining appropriate interpolation accuracy commensurate with signal-to-noise ratio.

29. Apparatus of claim 28 in which the said spacing comprises a spreading layer of conductivity sufficiently small as to permit functioning, a surface of such layer corresponding with the free surface of the said region.

30. Apparatus of claim 28 characterized in that the said initial signal comprises time-dependent, undigitized, analog initial positioning information, and in that the said initial signal detector includes a time domain, centroid-finding filter for interpolating position to yield positioning information of such resolution for inclusion in the final signal.

31. Apparatus of claim 1 in which said inputting implement comprises at least two styli for simultaneously coupling with said tablet.

32. Apparatus of claim 31 in which said inputting implement comprises three styli.

* * * * *